United States Patent
Frederiksen et al.

(10) Patent No.: US 10,042,101 B2
(45) Date of Patent: Aug. 7, 2018

(54) PROJECTION SYSTEM FOR A PROJECTOR AND/OR A VEHICLE LIGHT WITH A SCANNING DEVICE AND A HOLOGRAM

(71) Applicant: Robert Bosch GmbH, Stuttgart (DE)

(72) Inventors: Annette Frederiksen, Renningen (DE); Stefanie Mayer, Rottenburg am Neckar (DE)

(73) Assignee: ROBERT BOSCH GMBH, Stuttgart (DE)

( * ) Notice: Subject to any disclaimer, the term of this patent is extended or adjusted under 35 U.S.C. 154(b) by 165 days.

(21) Appl. No.: 15/344,821

(22) Filed: Nov. 7, 2016

(65) Prior Publication Data
US 2017/0139096 A1   May 18, 2017

(30) Foreign Application Priority Data
Nov. 12, 2015   (DE) .................. 10 2015 222 296

(51) Int. Cl.
*G02B 5/32* (2006.01)
*G02B 21/20* (2006.01)
(Continued)

(52) U.S. Cl.
CPC ................ *G02B 5/32* (2013.01); *F21S 41/14* (2018.01); *F21S 41/16* (2018.01); *F21S 41/25* (2018.01);
(Continued)

(58) Field of Classification Search
CPC . G02B 5/32; G02B 26/10; G02B 5/02; G03B 21/2066; G03B 21/204;
(Continued)

(56) References Cited

U.S. PATENT DOCUMENTS

| 4,450,359 A * | 5/1984 | Ross .................. G01N 21/8901 |
| | | 250/237 R |
| 4,842,396 A * | 6/1989 | Minoura .................. B41J 2/465 |
| | | 348/770 |

(Continued)

FOREIGN PATENT DOCUMENTS

| AT | 514438 A4 | 1/2015 |
| DE | 102013021688 A1 | 6/2015 |

(Continued)

*Primary Examiner* — Que T Le
*Assistant Examiner* — Jennifer Bennett
(74) *Attorney, Agent, or Firm* — Norton Rose Fulbright US LLP; Gerard Messina (57) ABSTRACT

A projection system for a projector and/or a vehicle light, comprising a light-scattering and/or conversion device and having a scanning device with which a light impingement region of the projected light is shiftable on the light-scattering and/or conversion device; the light-scattering and/or conversion device being configured for conversion and/or for physical scattering of the light projected onto the light-scattering and/or conversion device so that a light emitted into an external environment of the projection system encompasses an emitted light and/or physically scattered light having the at least one output wavelength; and the projection system encompassing a hologram onto which a physically unscattered light having the at least one output wavelength, which is transmitted at least once through the light-scattering and/or conversion device, impinges, and by which the physically unscattered light is deflectable.

11 Claims, 6 Drawing Sheets

(51) Int. Cl.
*F21S 41/14* (2018.01)
*F21S 41/16* (2018.01)
*F21S 41/675* (2018.01)
*F21S 41/25* (2018.01)
*G03B 21/20* (2006.01)
*G02B 26/10* (2006.01)
*G01J 1/42* (2006.01)
*G02B 5/02* (2006.01)
*F21S 41/20* (2018.01)

(52) U.S. Cl.
CPC ........... *F21S 41/285* (2018.01); *F21S 41/675* (2018.01); *G01J 1/42* (2013.01); *G02B 5/02* (2013.01); *G02B 26/10* (2013.01); *G03B 21/204* (2013.01); *G03B 21/208* (2013.01); *G03B 21/2066* (2013.01)

(58) Field of Classification Search
CPC ...... G03B 21/208; F21S 41/285; F21S 41/14; F21S 41/16; F21S 41/675; F21S 41/25; G01J 1/42
See application file for complete search history.

(56) References Cited

U.S. PATENT DOCUMENTS

| | | | |
|---|---|---|---|
| 6,473,209 B1* | 10/2002 | Popovich | G02B 27/2264 348/41 |
| 9,903,550 B2* | 2/2018 | Nauen | F21S 41/337 |
| 9,903,555 B2* | 2/2018 | Ohno | F21S 41/255 |
| 2011/0019250 A1* | 1/2011 | Aiki | G02B 5/32 359/15 |
| 2016/0153632 A1* | 6/2016 | Mitterlehner | F21S 48/1145 250/214 R |

FOREIGN PATENT DOCUMENTS

DE 102014205606 A1 10/2015
EP 2767751 A1 8/2014

* cited by examiner

PROJECTION SYSTEM FOR A PROJECTOR AND/OR A VEHICLE LIGHT WITH A SCANNING DEVICE AND A HOLOGRAM

RELATED APPLICATION INFORMATION

The present application claims priority to and the benefit of German patent application no. 10 2015 222 296.9, which was filed in Germany on Nov. 12, 2015, the disclosure of which is incorporated herein by reference.

FIELD OF THE INVENTION

The present invention relates to a projection system for a projector and/or a vehicle light. The invention further relates to a projector and a vehicle light for a vehicle.

BACKGROUND INFORMATION

Figure 1:
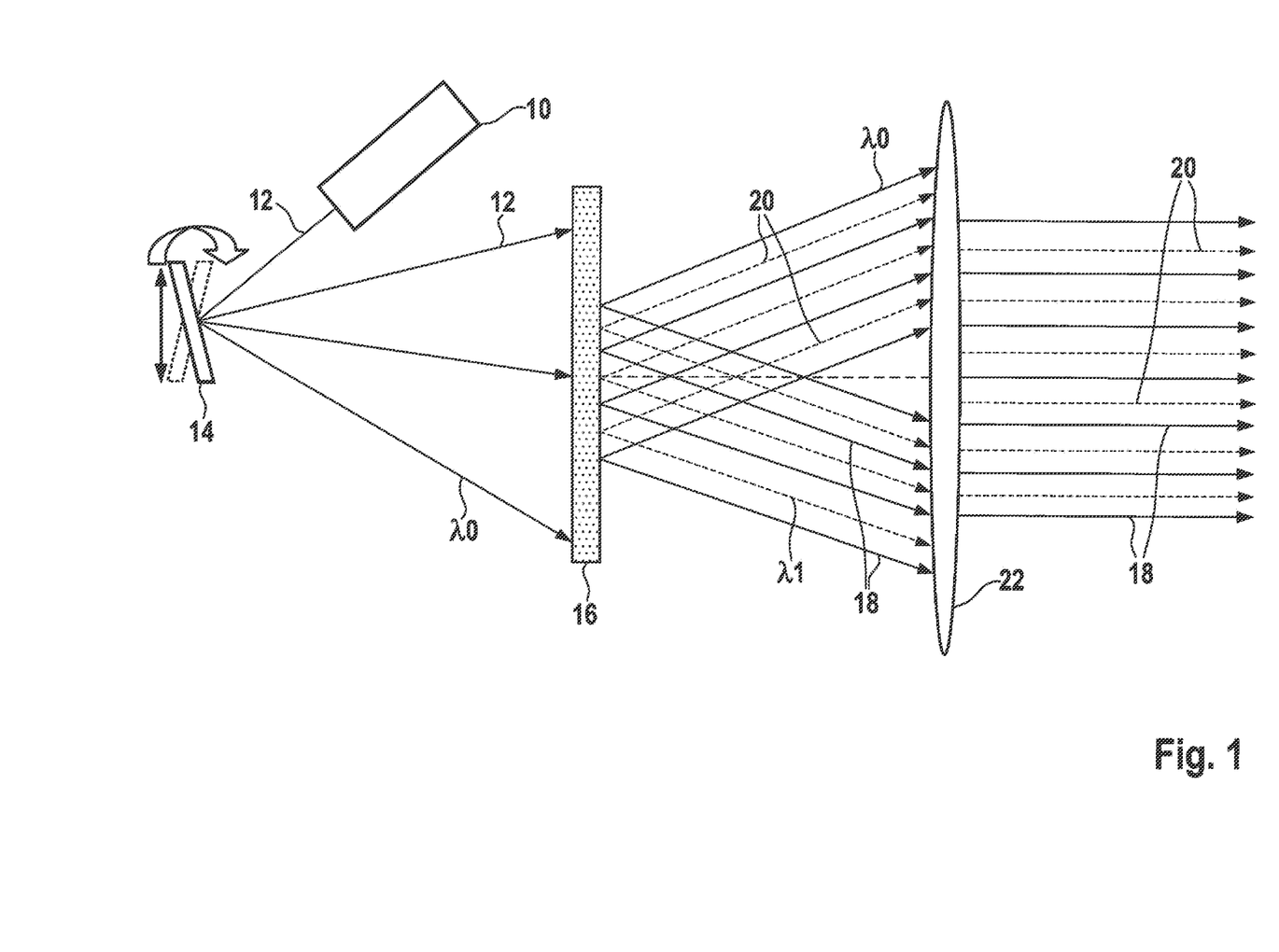
FIG. 1 shows a projection system in accordance with the existing art.

FIG. 1 shows a projection system in accordance with the existing art. A conventional projection system of this kind encompasses, for example, the motor vehicle headlight in DE 10 2013 021 688 A1.

The projection system according to the existing art depicted schematically in FIG. 1 has a light source 10 for emitting a light 12 having at least one output wavelength $\lambda 0$. Light 12 emitted from light source 10 is projectable by way of a scanning device 14, for example at least one mirror 14 displaceable around at least one rotation axis, onto a light-scattering and/or conversion device 16. A light impingement region of light 12 projected onto light-scattering and/or conversion device 16 is shiftable, by an operating mode of the scanning device 14, in such a way that light-scattering and/or conversion device 16 is scannable at least in part by way of the light impingement region. At least one phosphor, which absorbs light 12 emitted from light source 10 and physically scatters it, is deposited onto light-scattering and/or conversion device 16. In addition to light 18 having the at least one output wavelength $\lambda 0$ which is physically scattered by way of the at least one phosphor, light-scattering and/or conversion device 16 therefore also radiates a light 20, having at least one emission wavelength $\lambda 1$ different from the at least one output wavelength $\lambda 0$, which is emitted from the at least one phosphor. Light beams 18 and 20 having the wavelengths $\lambda 0$ and $\lambda 1$ which are radiated from light-scattering and/or conversion device 16 are emitted by way of at least one optic 22 into an external environment of the conventional projection system.

SUMMARY OF THE INVENTION

The invention creates a projection system having the features described herein, a projector having the features described herein, and/or a vehicle light for a vehicle, having the features described herein.

The present invention creates a projection system having a reliable capability for filtering out parasitic radiation occurring at defects/holes on a light-scattering and/or conversion device. It is thereby possible to ensure in targeted fashion that despite the occurrence of defects or aging effects on the light-scattering and/or conversion device, the projection system continues to perform its desired function in such a way that an attractiveness of the light signal sent out from the projection system remains ensured, and there is no risk of endangering the viewer's eye safety due to parasitic radiation.

In a refinement, the projection system also possesses a capability for automatic recognition of defects/holes on the light-scattering and/or conversion device on the basis of the sensor signal furnished by its light detection device. With the projection system according to the present invention it is possible in particular to recognize, automatically and reliably, the location of the light impingement region at which it impinges upon a defect/hole. The projection system can then be operated in such a way that generation of the parasitic interference radiation is suppressed.

The projection system according to the present invention creates the advantages described in the preceding paragraphs because it is equipped with the hologram and optionally also with the light detection device. These components require comparatively little installation space and, as described in more detail below, can be disposed in the projection system with a comparatively wide degree of geometric freedom. Despite being equipped with the hologram and optionally also with the light detection device, the projection system according to the present invention can thus be configured to be comparatively light and to require little installation space.

Advantageously, the projection system encompasses a light detection device having at least one detection surface onto which the physically unscattered light having the at least one output wavelength, transmitted through the light-scattering and/or conversion device, is deflectable by way of the hologram; a sensor signal with regard to an intensity, detected by way of the light detection device, of the light impinging upon the at least one detection surface, or a derived signal, being outputtable to the control system. This creates the advantages already described above.

In an advantageous embodiment the projection system-internal or external control system is configured to identify from a value range of possible locations of the light impingement region on the light-scattering and/or conversion device, in consideration of the sensor signal or of the derived signal, at least one location of the light impingement region on the light-scattering and/or conversion device as a problem location, and then to operate the projection system in such a way that an intensity of the light projected onto the light-scattering and/or conversion device is reduced at the at least one identified problem location and/or the at least one identified problem location is traveled over more quickly as compared with a remainder of the value range of possible locations of the light impingement region on the light-scattering and/or conversion device. Reliable detection of a defect site/hole on the light-scattering and/or conversion device can thus be used for subsequent "selective dimming" or "selective skipping" of the respective location of the light impingement region. Illumination of the recognized defect site/hole can thus be suppressed, and physically unscattered light having the at least one output wavelength can therefore no longer enter the eye of a viewer of the light signal emitted from the projection system. There is therefore no risk of endangering the viewer's eye safety.

The projection system may encompasse an evaluation device that is configured to recognize, based on the sensor signal, when the detected intensity exceeds a predefined normal value range, and if applicable to furnish a corresponding derived signal to the projection system-internal or external control system. In this case the projection system-internal or external control system can be configured to recognize in consideration of the derived signal whether, at at least one location of the light impingement region on the light-scattering and/or conversion device out of the value range of possible locations, an exceedance of the predefined normal value range by the detected intensity has been ascertained at least once, and if applicable to identify the at least one respective location as a problem location, and then to operate the projection system in such a way that an intensity of the light projected onto the light-scattering and/or conversion device is reduced at the at least one identified problem location and/or the at least one identified problem location is traveled over more quickly as compared with the remainder of the value range of possible locations of the light impingement region on the light-scattering and/or conversion device. The evaluation device used in this exemplifying embodiment, and the control system interacting therewith, can be embodied as inexpensive electronics requiring little installation space. The projection system equipped therewith thus ensures a high safety standard, and emission of an attractive light signal, without requiring costly or complex electronics.

For example, the projection system can encompass a transmission hologram as the hologram. The projection system can also encompass a reflection hologram as the hologram. A wide geometric freedom in the design of the projection system according to the present invention is ensured by the capability created for selectable utilization of a reflection or transmission hologram.

The transmission hologram or reflection hologram can furthermore also be applied directly onto a projection lens with which the light emitted from the projection system is projectable into the external environment of the projection system. The multifunctionality of the projection lens thereby created makes possible an additional reduction of the projection system.

In a further advantageous embodiment the projection system encompasses an edge-lit hologram as the hologram. The use of an edge-lit hologram also allows the projection system to be minimized.

All the advantages described above can also be brought about by way of a projector or a vehicle light for a vehicle, having a projection system of this kind.

Further features and advantages of the present invention will be explained below with reference to the Figures.

DETAILED DESCRIPTION

Figure 2:
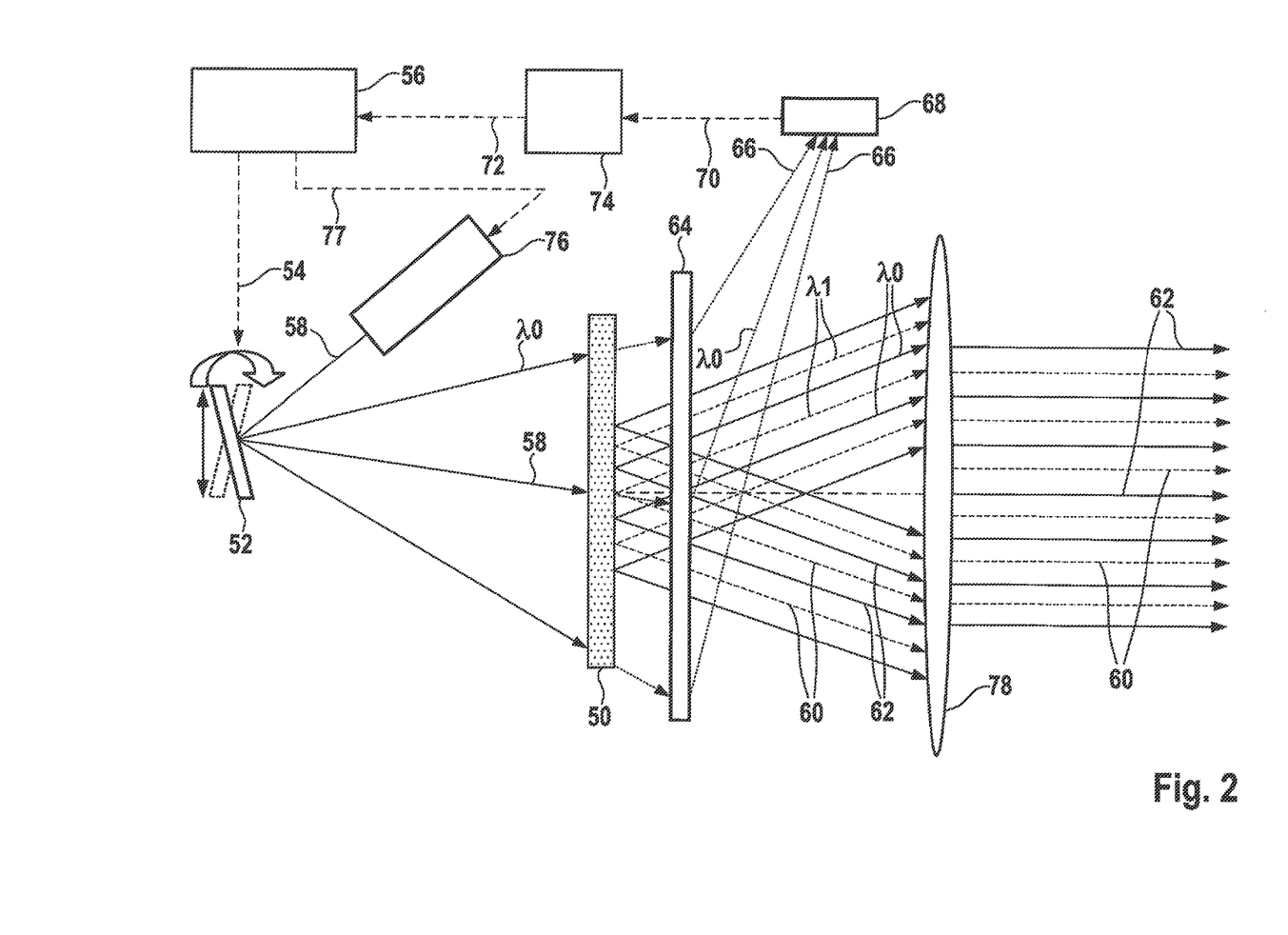
FIG. 2 schematically depicts a first embodiment of the projection system.

FIG. 2 schematically depicts a first embodiment of the projection system.

The projection system schematically depicted in FIG. 2 encompasses a light-scattering and/or conversion device 50 and a scanning device 52 interacting therewith. Scanning device 52 can be controlled, by way of at least one control signal 54 of a projection system-internal or external control system 56, in such a way that a light 58 generated in the projection system or incident into the projection system, having at least one output wavelength $\lambda 0$ (and an output intensity), is projectable onto light-scattering and/or conversion device 50. Projected light 58 impinges upon a partial surface/partial volume of light-scattering and/or conversion device 50 which is referred to hereinafter as a "light impingement region." The light impingement region of projected light 58 is furthermore shiftable on light-scattering and/or conversion device 50 by way of scanning device 52 that is controlled (by the at least one control signal 54). This can be restated as: as a result of an operating mode of scanning device 52, light-scattering and/or conversion device 50 is at least one-dimensionally, which may be two-dimensionally, scannable by the light impingement region.

A mirror/micromirror 52 displaceable around at least one rotation axis can be used, for example, in the projection system as scanning device 52. The at least one mirror/micromirror 52 can be displaceable around the at least one rotation axis (in particular quasi-statically and/or harmonically) by way of at least one electrostatic, magnetic, and/or piezoelectric actuator of scanning device 52. The embodiment depicted in FIG. 2 of scanning device 52 as a mirror/micromirror 52 is to be understood, however, only as an example.

Light-scattering and/or conversion device 50 is configured to convert and/or physically scatter light 58 projected onto light-scattering and/or conversion device 50. A light/light signal radiated from light-scattering and/or conversion device 50 and emitted into an external environment of the projection system therefore encompasses (at least) an emitted light 60 having an emission wavelength $\lambda 1$ differing from the at least one output wavelength $\lambda 0$, and/or a physically scattered light 62 having the at least one output wavelength $\lambda 0$. This ensures that the light/light signal emitted into the external environment of the projection system seems pleasant to a viewer.

In the example of FIG. 2, light-scattering and/or conversion device 50 has at least one phosphor/dye. For example, the at least one phosphor can be deposited onto a projection surface used as light-scattering and/or conversion device 50, or introduced into a body used as light-scattering and/or conversion device 50. The light/light signal radiated from light-scattering and/or conversion device 50 and emitted into an external environment of the projection system thus encompasses (at least) light 60 having an emission wavelength $\lambda 1$ (differing from the at least output wavelength $\lambda 0$) of the at least one phosphor which is emitted from the at least one phosphor, and/or light 62 having the at least one output wavelength $\lambda 0$ which is physically scattered from the at least one phosphor. Alternatively, however, light-scattering and/or conversion device 50 can also be configured without a phosphor/dye for "mixing," in particular "white mixing," of multiple output wavelengths $\lambda 0$.

Light 58 projected onto light-scattering and/or conversion device 50 can be monochromatic light 58 or polychromatic light 58. Light 58 having at least one output wavelength $\lambda 0$ in the blue spectral region is often advantageous. In this case a plurality of phosphors usable for light-scattering and/or conversion device 50 are suitable for absorbing the at least one output wavelength $\lambda 0$. The phosphors excited by absorption of the at least one output wavelength $\lambda 0$ often emit light 60 having at least one emission wavelength $\lambda 1$ in the yellow spectral region, so that a superposition of light 60 having the at least one emission wavelength $\lambda 1$ which is emitted from the at least one phosphor, and the physically scattered light 62 having the at least one output wavelength $\lambda 0$, generates a white light that seems pleasant to a viewer.

A usability of the projection system is not limited, however, to a specific spectrum of the at least one output wavelength λ0 or of the at least one emission wavelength λ1.

The at least one phosphor/dye deposited onto light-scattering and/or conversion device 50 can be, for example, phosphorus. Phosphorus is a good absorber of output wavelengths λ0 around 450 nm, and emits emission wavelengths λ1 around 570 nm. Phosphorus is therefore advantageously suitable for generating white light. Phosphorus is furthermore also suitable for physical/diffuse light scattering. Phosphorus is also a comparatively inexpensive phosphor. As will be explained below in further detail, the projection system described here can continue to be operated even after local bleaching of the at least one phosphor/dye, retaining good signal quality and a high safety standard. Light 58 projected onto light-scattering and/or conversion device 50 can therefore have a comparatively high intensity/output intensity (e.g. a power level of over 50 W) even when phosphorus is used as the at least one phosphor. A plurality of other phosphors/dyes can, however, also be used for the projection system instead of and as a supplement to phosphorus.

It can happen in the context of deposition/introduction of the at least one phosphor onto/into light-scattering and/or conversion device 50, however, that the at least one phosphor inadvertently is not, or is insufficiently, deposited/introduced onto/into at least one sub-region (which can be referred to as a "defect region") of light-scattering and/or conversion device 50. The at least one phosphor can furthermore become bleached out at/in at least one (further) defect region as a result of aging effects and/or excessive power levels of light 58 projected onto light-scattering and/or conversion device 50. The at least one defect region is also often referred to as a "hole" on/in light-scattering and/or conversion device 50.

With all the defects described here, the risk exists that a light 58, projected onto the respective defect region, will pass/be transmitted with (almost) no interaction with the at least one phosphor, and therefore be radiated into the external environment of the projection system as directed coherent light 66. The directed coherent light 66 occurring as a result of the at least one defect region in light-scattering and/or conversion device 50 is often also referred to as "parasitic radiation." An occurrence of parasitic radiation in the light/light signal radiated into the external environment of the projection system often degrades the latter's attractiveness for a viewer. An impingement of parasitic radiation onto an eye of the viewer can also be unpleasant for him or her. In particular, if light 58 projected onto light-scattering and/or conversion device 50 has an intensity/output intensity sufficient to excite photochemical processes in the tissue of the human eye, parasitic radiation can endanger the viewer's eye safety. As will be explained below, however, the projection system of FIG. 2 ensures that all the aforementioned defects are detectable (almost) immediately, and that the occurrence of parasitic radiation during subsequent operation of the projection system is reliably prevented.

The projection system of FIG. 2 also has for that purpose a hologram 64 that is disposed in such a way that the physically unscattered light 66 having the at least one output wavelength λ0 (transmitted at least once through light-scattering and/or conversion device 50), which occurs as parasitic radiation e.g. because of the above-described defects, impinges upon hologram 64. The physically unscattered light is deflectable/becomes deflected as a result of hologram 64. Conversely, light 60 (having an emission wavelength λ1 of the at least one phosphor which differs from the at least one output wavelength λ0) which is emitted from the at least one phosphor, and/or light 62 (having the at least one output wavelength λ0) which is physically scattered by the at least one phosphor, pass (almost) undeflected through hologram 64. Hologram 64 thus offers the possibility of filtering out the physically unscattered light 66 having the at least one output wavelength λ0.

"Hologram" 64 (holographic optical element, HOE) can be understood as an optical element configured to (spectrally specifically) deflect the at least one output wavelength λ0. For example, a type of hologram that deflects only light in the blue spectral region can be used in the projection system. Hologram 64 can thus be configured so that the at least one emission wavelength λ1, which lies e.g. in the yellow spectral region, passes (undeflected/unhindered) through hologram 64. In addition to a wavelength selectivity of this kind, hologram 64 can also have good angle selectivity, so that while the physically unscattered light 66 (having the at least one output wavelength λ0) is deflected, light 62 (having the at least one output wavelength λ0) that is physically scattered by the at least one phosphor passes (undeflected/unhindered) through hologram 64. For such functionality of hologram 64, for example, a spherical wave deflector function can be realized at hologram 64, a center of a spherical wave being located in an optic of scanner device 52, for example the at least one mirror/micromirror 52. A center of another spherical wave can be located on at least one detection surface of a light detection device 68 (yet to be described). Advantageously, hologram 64 is a volume hologram (e.g. photopolymers), since this type of hologram is notable for very good selectivity (angle selectivity and wavelength selectivity).

The projection system furthermore may encompass a light detection device 68 having at least one detection surface onto which the physically unscattered light 66 having the at least one output wavelength λ0 (transmitted at least once through light-scattering and/or conversion device 50) is deflectable by way of hologram 64. For example, at least one photodiode can be used as light detection device 68. The range of embodiment of the projection system is not limited, however, to a specific type of light detection device 68 thereof. A sensor signal 70 regarding a detected intensity of light 66 impinging upon the at least one detection surface can be furnished by way of light detection device 68. Sensor signal 70, or a signal 72 derived in consideration of sensor signal 70, can be outputted to control system 56.

The advantages of the projection system are thus not limited only to filtering out the physically unscattered light 66 having the at least one output wavelength λ0 with the result that emission of parasitic radiation into the physical environment of the projection system is prevented. In addition to filtering out the physically unscattered light 66, the advantageous interaction of hologram 64 and light detection device 68 also allows recognition, based on the detected intensity, of an overlap of the light impingement region with the at least one defect region. It is thus possible to recognize, during (one-dimensional or two-dimensional) scanning of light-scattering and/or conversion device 50 by the light impingement region, whether, how often, and at what light impingement region (from a value range of possible locations of the light impingement region) the physically unscattered light 66 is being radiated from light-scattering and/or conversion device 50.

The information obtained can then be used in targeted fashion to prevent projection of a high light intensity onto the at least one recognized defect region. In addition to recognition of an occurrence and a prevalence of defect regions on light-scattering and/or conversion device 50, a further operating mode of the projection system is also possible in which despite the at least one defect region, a light/light signal that is attractive to a viewer is radiated into the external environment of the projection system and there is no danger to the eye safety of the viewer. Preventing the emission of parasitic radiation by the projection system therefore also does not require immediate "deactivation" of the projection system. Instead, with the advantageous design of the projection system which is described here, attractive light/light signals can continue to be produced while simultaneously ensuring the desired eye safety for the viewer.

Control system 56 may be configured to operate the projection system, in consideration of sensor signal 70 or of derived signal 72, in such a way that only a minimum possible light intensity of light 58 is incident onto the at least one recognized defect region. For example, control system 56 can operate the projection system in such a way that the intensity/output intensity of light 58 projected onto light-scattering and/or conversion device 50 is reduced in the context of an overlap of the light impingement region with the at least one recognized defect region, and/or the at least one recognized defect region is traveled over/"skipped" more quickly (as compared with the remainder of light-scattering and/or conversion device 50) in the context of scanning of light-scattering and/or conversion device by the light impingement region.

For example, control system 56 defines, in consideration of sensor signal 70 or of derived signal 72, at least one location of the light impingement region on light-scattering and/or conversion device 50 (from the value range of possible locations of the light impingement region on light-scattering and/or conversion device 50) as a problem location. Control system 56 may always define the (current) location of the light impingement region having an increased detected intensity as a problem location. Control system 56 then operates the projection system in such a way that the intensity/output intensity of light 58 projected onto light-scattering and/or conversion device 50 at the at least one defined problem location is reduced (in particular is set to zero), and/or the at least one defined problem location is traveled over/"skipped" more quickly (as compared with the remainder of the value range of possible locations of the light impingement region on light-scattering and/or conversion device 50).

The projection system of FIG. 2 encompasses, by way of example, an evaluation device 74 that is configured to recognize, based on sensor signal 70, whether the detected intensity exceeds a predefined normal value range, and if applicable to furnish a corresponding signal 72 to control system 56. In this case control system 56 may be configured to recognize in consideration of signal 72 the at least one location of the light impingement region on light-scattering and/or conversion device (from the value range of possible locations) for which an exceedance of the predefined normal value range by the detected intensity has been ascertained (by evaluation device 74) at least once, and to define the respective location as the at least one problem location. Evaluation device 74 can be an electronic system embodied separately from control system 56, or a sub-unit of control system 56.

In the embodiment of FIG. 2, the projection system encompasses its own light source 76. As a possible exemplifying embodiment, light source 76 is a laser 76. In a possible refinement, the projection system can also have several light sources 76 that, for example, emit various output wavelengths λ0. Be it noted, however, that a range of embodiment of the projection system is not limited either to a specific type of the at least one light source 76 or to its being equipped with at least one light source 76 of its own. For example, the projection system can also interact with at least one light emitting apparatus disposed externally thereto.

Control system 56 can control the at least one projection system-internal light source 76 or the at least one external light-emitting apparatus, by way of a control signal 77, in such a way that the intensity/output intensity of light 58 near/at a recognized/detected problem location is reduced. In addition, however, at least one light blocking apparatus that is disposed between the at least one light source 76/at least one external light emitting apparatus and scanning device 52 can also be controlled by control system 56 in such a way that light 58 is interrupted/blocked near/at a recognized/defined problem location. As an alternative or as a supplement, scanning device 52 can also be controlled by way of control signal 54 of control system 56 in such a way that the at least one recognized/defined problem location, or at least a location in the vicinity thereof, is traveled over/"skipped" more quickly as compared with the remainder of the value range of possible locations of the light impingement region on light-scattering and/or conversion device 50.

In the embodiment of FIG. 2 the projection system also encompasses a projection lens 78 with which light 60 and 62 emitted from the projection system is projectable into the external environment of the projection system. The projection system of FIG. 2 can also encompass further optical components in addition to the ones depicted.

Merely by way of example, hologram 64 is a transmission hologram 64 disposed/embodied (physically) separately from projection lens 78. As a modification of the embodiment of FIG. 2, however, transmission hologram 64 can also be applied directly onto projection lens 78.

Figure 3:
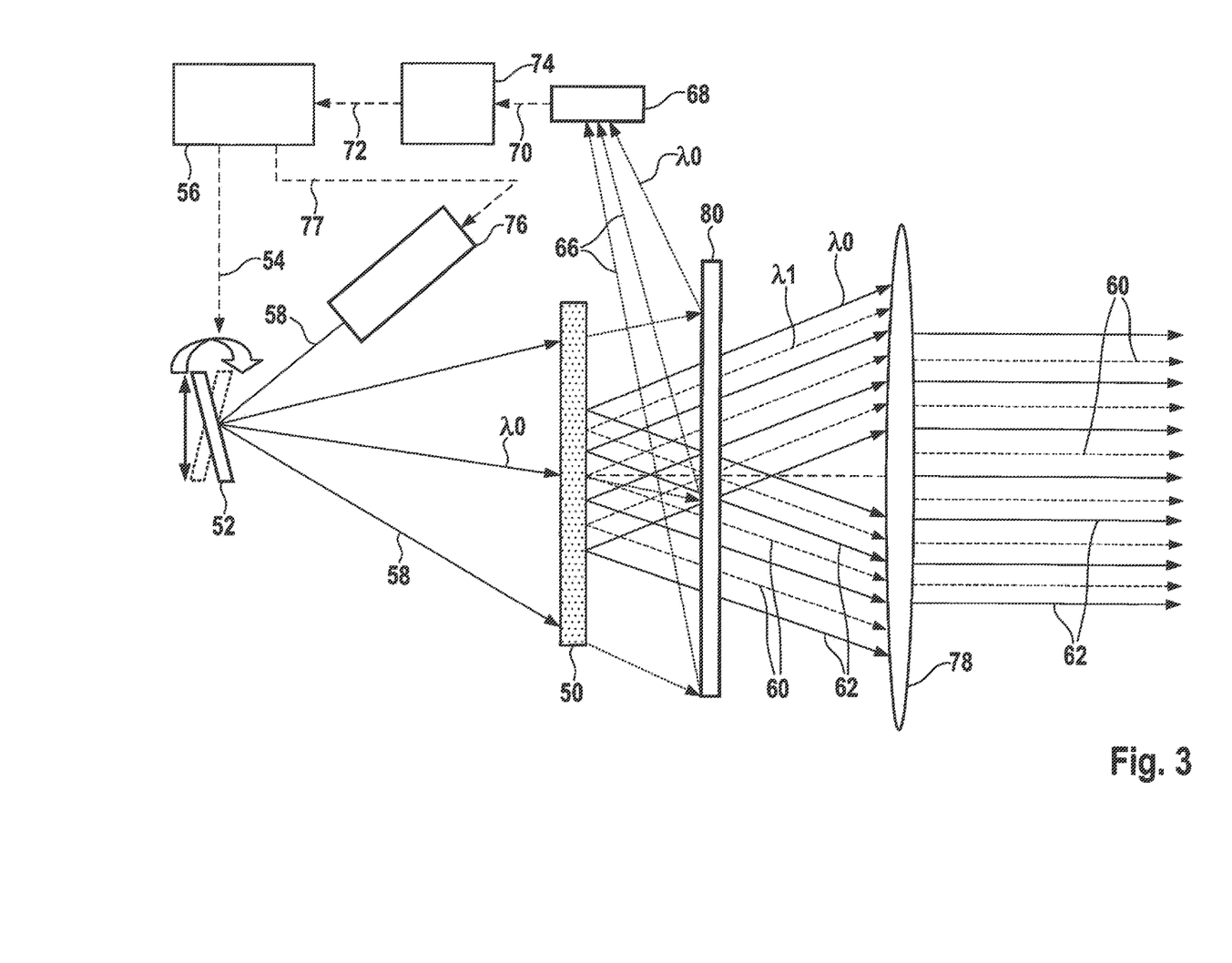
FIG. 3 schematically depicts a second embodiment of the projection system.

FIG. 3 schematically depicts a second embodiment of the projection system.

The projection system schematically depicted in FIG. 3 has as hologram 80 a reflection hologram 80 disposed/embodied physically separately from projection lens 78. The interacting light detection device 68 is correspondingly disposed so that the physically unscattered light 66 is reflected by way of hologram 80 onto at least one detection surface of said device. Reference is made to the description above with regard to the further components/features of the projection system of FIG. 3.

Figure 4:
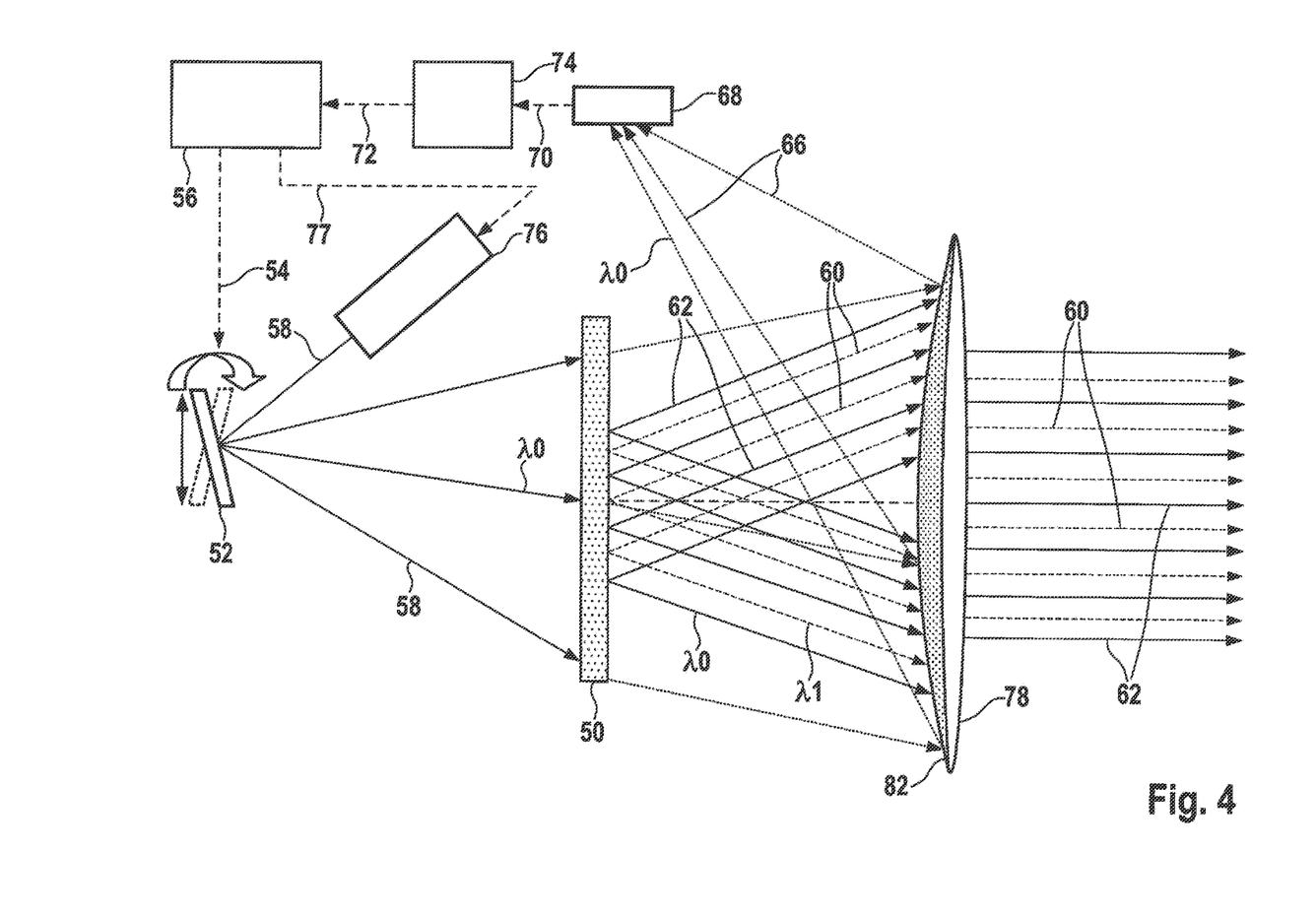
FIG. 4 schematically depicts a third embodiment of the projection system.

FIG. 4 schematically depicts a third embodiment of the projection system.

In contrast to the embodiment described previously, in the projection system of FIG. 4 reflection hologram 82 is applied directly onto projection lens 78. Direct application of a reflection or transmission hologram onto projection lens 78 makes possible a reduction in its installation space requirement. It is likewise possible to replace a reflection hologram or transmission hologram with a holographic lens. The latter can be configured, for example, as a stack of two reflection hologram or transmission holograms, thus resulting in further installation space advantages and greater design freedom.

Figure 5:
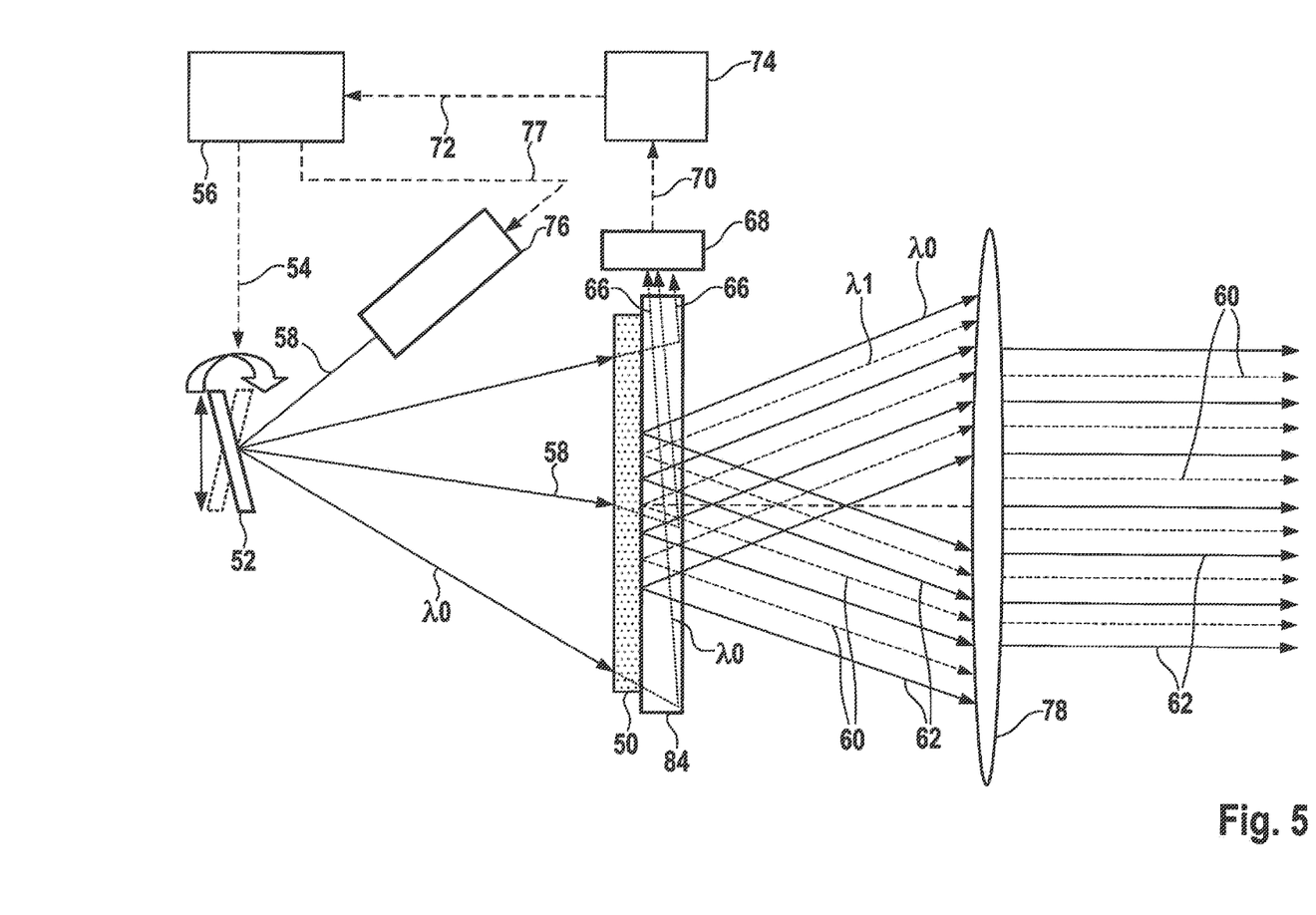
FIG. 5 schematically depicts a fourth embodiment of the projection system.

FIG. 5 shows a schematic embodiment of a fourth embodiment of the projection system.

The projection system schematically depicted in FIG. 5 encompasses an edge-lit hologram 84 as hologram 84. Edge-lit hologram 84 can contact light-scattering and/or conversion device 50. Light 66 deflected onto the at least one detection surface can furthermore be directed in edge-lit hologram 84 directly to light detection device 68 disposed at an edge of edge-lit hologram 84. A single-pixel detector or a linear array can thus also be used for light detection device 68. Equipping the projection system with edge-lit hologram 84 thus makes minimization thereof appreciably easier.

All the projection systems described above can be utilized in a projector/laser projector. All the projection systems described above can also be used in a vehicle light/headlight (laser headlight) for a vehicle. A headlight of this kind, constituting a so-called "adaptive headlight," can perform a function of different vehicle lights, for example low beam, high beam, fog light, dynamic cornering light, expressway light, city light, and/or bad-weather light, depending on what is selected (e.g. by the driver). The selection of a light distribution existing at the headlight can also be made in situation-dependent fashion by an automatic vehicle system. The headlight can therefore also be described as an "active headlight." Be it noted again that such a headlight is not limited to a predefined light distribution but instead makes possible any desired light distribution in a vehicle environment. With such a headlight, for example, it is possible to blank out oncoming or preceding vehicles within an own-vehicle high beam cone, which can also be described as a so-called "dazzle-free" high beam.

Possible hazard sources can also be emphasized for the driver by direct illumination.

With all the embodiments described above, an efficiency of hologram 64, 80 to 84 can be adjusted by way of its material parameters or a suitable exposure upon imaging of the hologram. The selected efficiency can be of such a (low) magnitude that with an intact phosphor deposit on light-scattering and/or conversion device 50, the proportion of light 66 deflected onto the at least one detection surface is so low that light detection device 68 detects little/no intensity, whereas the detected intensity is appreciably higher in the event of a defect.

It is likewise possible to select an efficiency to be higher in specific regions of hologram 64, 80 to 84 (e.g. pixels at the edge), so that light detection apparatus 68 already measures an intensity even in a context of defect-free operation of the projection system. A calibration or adjustment of the projection system by way of light 66 deflected onto the at least one detection surface can thus be performed as an additional function. The possibility furthermore exists of writing the volume hologram pixel by pixel. With a manufacturing method of this kind, each pixel of hologram 64, 80 to 84 can have its own optical function. The angles can be precisely adapted for each pixel. A combination with a linear or matrix array (instead of a single-pixel detector) for light detection device 68 would also be conceivable in this context. It is thus also possible to detect, by way of such a design of hologram 64, 80 to 84, the site at which the at least one defect region is located, and then to implement at least one of the above-described options for attenuating/preventing illumination of the at least one detected defect region.

Figure 6A:
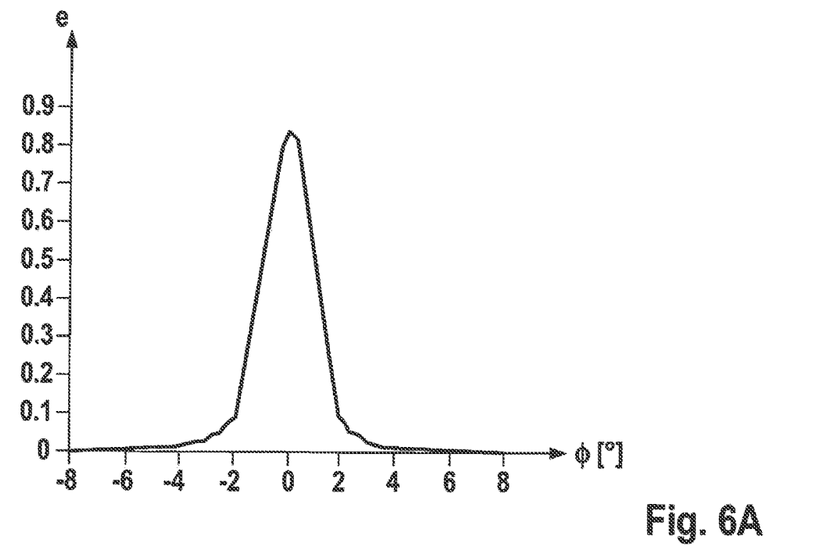
FIGS. 6A and 6B show coordinate systems to explain an angle selectivity and wavelength selectivity of volume holograms usable for the projection system.
Figure 6B:
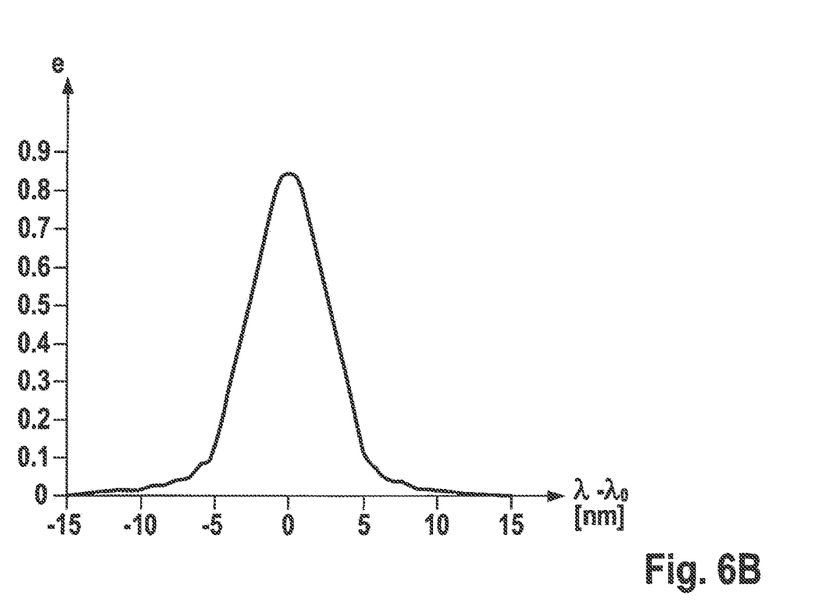

FIGS. 6A and 6B show coordinate systems to explain an angle selectivity and wavelength selectivity of volume holograms usable for the projection system. The abscissas of the coordinate systems of FIGS. 6A and 6B indicate an angle of incidence $\phi$ of light having the output wavelength $\lambda 0$ (in degrees), or a difference between a wavelength of light and output wavelength $\lambda 0$ having an angle of incidence $\phi=0$ (in nanometers). A diffraction efficiency e is reproduced by the ordinates of the coordinate systems of FIGS. 6A and 6B.

As is evident from FIGS. 6A and 6B, light is diffracted for the desired target function at the volume hologram only within a defined angle range and wavelength range. The holographic layer is transparent to light outside the defined range. A width of those ranges is predefined by a thickness and a material-specific refractive index modulation of a holographic material.

Despite the possibility for reliable detection of defects, the wavelength sensitivity and angle sensitivity of the volume holograms thus ensure that the volume holograms produce only negligible/low attenuation of the light/light signal radiated from the projection system.

What is claimed is:

1. A projection system for a projector and/or a vehicle light, comprising:
   a light-scattering and/or conversion device;
   a scanning device which is controllable by a projection system-internal or external control system so that a light generated in the projection system or incident into the projection system, having at least one output wavelength, is projectable onto the light-scattering and/or conversion device, wherein a light impingement region of the projected light is shiftable on the light-scattering and/or conversion device by the controlled scanning device, and wherein the light-scattering and/or conversion device is configured for conversion and/or for physical scattering of the light projected onto the light-scattering and/or conversion device so that a light emitted into an external environment of the projection system encompasses an emitted light and/or a physically scattered light having the at least one output wavelength; and
   a hologram onto which a physically unscattered light having the at least one output wavelength, which is transmitted at least once through the light-scattering and/or conversion device, impinges, and by which the physically unscattered light is deflectable.

2. The projection system of claim 1, further comprising:
   a light detection device having at least one detection surface onto which the physically unscattered light having the at least one output wavelength, which is transmitted through the light-scattering and/or conversion device, is deflectable by the hologram, and wherein a sensor signal, with regard to an intensity, and which is produced by the light detection device by detecting the light impinging upon the at least one detection surface, or a signal derived therefrom is output to the control system.

3. The projection system of claim 2, wherein the projection system-internal or external control system is configured to identify from a value range of possible locations of the light impingement region on the light-scattering and/or conversion device, in consideration of the sensor signal or of the derived signal, at least one location of the light impingement region on the light-scattering and/or conversion device as a problem location, and then to operate the projection system so that an intensity of the light projected onto the light-scattering and/or conversion device is reduced at the at least one identified problem location and/or the at least one identified problem location is traveled over more quickly as compared with a remainder of the value range of possible locations of the light impingement region on the light-scattering and/or conversion device.

4. The projection system of claim 2, further comprising:
   an evaluation device to recognize, based on the sensor signal, when the detected intensity exceeds a predefined normal value range, and if applicable to furnish a corresponding derived signal to the projection system-internal or external control system.

5. The projection system of claim 4, wherein the projection system-internal or external control system is configured to recognize in consideration of the derived signal whether, at at least one location of the light impingement region on the light-scattering and/or conversion device out of the value range of possible locations, an exceedance of the predefined normal value range by the detected intensity has been ascertained at least once, and if applicable to identify the at least one respective location as a problem location, and then to operate the projection system so that an intensity of the light projected onto the light-scattering and/or conversion device is reduced at the at least one identified problem location and/or the at least one identified problem location is traveled over more quickly as compared with the remainder of the value range of possible locations of the light impingement region on the light-scattering and/or conversion device.

6. The projection system of claim 1, wherein the hologram is a transmission hologram.

7. The projection system of claim 1, wherein the hologram is a reflection hologram.

8. The projection system of claim 1, wherein hologram is a transmission hologram or a reflection hologram and is applied directly onto a projection lens with which the light emitted from the projection system is projectable into the external environment of the projection system.

9. The projection system of claim 1, wherein the hologram is an edge-lit hologram.

10. A projector, comprising:
a projection system for a projector and/or a vehicle light, including:
 a light-scattering and/or conversion device;
 a scanning device which is controllable by a projection system-internal or external control system so that a light generated in the projection system or incident into the projection system, having at least one output wavelength, is projectable onto the light-scattering and/or conversion device, wherein a light impingement region of the projected light is shiftable on the light-scattering and/or conversion device by the controlled scanning device, and wherein the light-scattering and/or conversion device is configured for conversion and/or for physical scattering of the light projected onto the light-scattering and/or conversion device so that a light emitted into an external environment of the projection system encompasses an emitted light and/or a physically scattered light having the at least one output wavelength; and
 a hologram onto which a physically unscattered light having the at least one output wavelength, which is transmitted at least once through the light-scattering and/or conversion device, impinges, and by which the physically unscattered light is deflectable.

11. A vehicle light for a vehicle, comprising:
a projection system, including:
 a light-scattering and/or conversion device;
 a scanning device which is controllable by a projection system-internal or external control system so that a light generated in the projection system or incident into the projection system, having at least one output wavelength, is projectable onto the light-scattering and/or conversion device, wherein a light impingement region of the projected light is shiftable on the light-scattering and/or conversion device by the controlled scanning device, and wherein the light-scattering and/or conversion device is configured for conversion and/or for physical scattering of the light projected onto the light-scattering and/or conversion device so that a light emitted into an external environment of the projection system encompasses an emitted light and/or a physically scattered light having the at least one output wavelength; and
 a hologram onto which a physically unscattered light having the at least one output wavelength, which is transmitted at least once through the light-scattering and/or conversion device, impinges, and by which the physically unscattered light is deflectable.

* * * * *